United States Patent
Sun et al.

(10) Patent No.: US 12,147,128 B2
(45) Date of Patent: Nov. 19, 2024

(54) DISPLAY PANEL, DISPLAY DEVICE AND METHOD FOR MANUFACTURING DISPLAY PANEL

(71) Applicants: KUNSHAN NEW FLAT PANEL DISPLAY TECHNOLOGY CENTER CO., LTD., Jiangsu (CN); KUNSHAN GO-VISIONOX OPTO-ELECTRONICS CO., LTD., Jiangsu (CN)

(72) Inventors: Jingzhong Sun, Kunshan (CN); Xiangqian Wang, Kunshan (CN); Rubo Ying, Kunshan (CN)

(73) Assignees: KUNSHAN NEW FLAT PANEL DISPLAY TECHNOLOGY CENTER CO., LTD., Kunshan (CN); KUNSHAN GO-VISIONOX OPTO-ELECTRONICS., LTD., Kunshan (CN)

( * ) Notice: Subject to any disclaimer, the term of this patent is extended or adjusted under 35 U.S.C. 154(b) by 355 days.

(21) Appl. No.: 17/520,038

(22) Filed: Nov. 5, 2021

(65) Prior Publication Data
US 2022/0057839 A1 Feb. 24, 2022

Related U.S. Application Data

(63) Continuation of application No. PCT/CN2020/105059, filed on Jul. 28, 2020.

(30) Foreign Application Priority Data

Oct. 9, 2019 (CN) .......................... 201910955023.0

(51) Int. Cl.
*G02F 1/1345* (2006.01)
*G06F 1/26* (2006.01)

(52) U.S. Cl.
CPC ............ *G02F 1/13452* (2013.01); *G06F 1/26* (2013.01); *G02F 2201/56* (2013.01)

(58) Field of Classification Search
CPC ............ G02F 1/13452; B32B 3/02–04; H10K 77/10–111; G09F 9/301; G09G 3/03–035
See application file for complete search history.

(56) References Cited

U.S. PATENT DOCUMENTS 6,530,302 B1    3/2003  Rogers
2015/0294987 A1 10/2015 Xia et al.
(Continued)

FOREIGN PATENT DOCUMENTS

CN    102271455 A   12/2011
CN    204651320 U    9/2015
(Continued)

OTHER PUBLICATIONS

Office Action issued on May 7, 2022, in connection with corresponding Chinese Application No. 201910955023.0 (11 pp., including machine-generated English translation).
(Continued)

*Primary Examiner* — Mariceli Santiago
(74) *Attorney, Agent, or Firm* — Maier & Maier, PLLC

(57) ABSTRACT

A display panel and display device, and a method for manufacturing the display panel. The display panel includes a substrate and an edge trace. The substrate includes a first display region and at least two bending regions, and two adjacent ones of the at least two bending regions are bent to a same side or opposite side of the substrate. The edge trace includes a first segment, a second segment and a third segment which are connected in sequence. The first segment of the edge trace and the third segment of the edge trace are respectively located in the two adjacent ones of the at least
(Continued)

two bending regions, and the second segment of the edge trace is located in the first display region.

20 Claims, 8 Drawing Sheets

(56) References Cited

U.S. PATENT DOCUMENTS

| | | |
|---|---|---|
| 2018/0074361 A1 | 3/2018 | Chung et al. |
| 2019/0108793 A1 | 4/2019 | Kim et al. |
| 2019/0140200 A1 | 5/2019 | Lee et al. |
| 2019/0181363 A1* | 6/2019 | Lee .................. H10K 50/828 |
| 2019/0280225 A1 | 9/2019 | Choi et al. |
| 2019/0288238 A1 | 9/2019 | Kajiyama |

FOREIGN PATENT DOCUMENTS

| | | |
|---|---|---|
| CN | 105144270 A | 12/2015 |
| CN | 106560778 A | 4/2017 |
| CN | 206757265 U | 12/2017 |
| CN | 107784940 A | 3/2018 |
| CN | 107819009 A | 3/2018 |
| CN | 107945663 A | 4/2018 |
| CN | 207183276 A | 4/2018 |
| CN | 107994036 A | 5/2018 |
| CN | 207558310 U | 6/2018 |
| CN | 108594550 A | 9/2018 |
| CN | 108807477 A | 11/2018 |
| CN | 108873510 A | 11/2018 |
| CN | 208077535 U | 11/2018 |
| CN | 208271481 U | 12/2018 |
| CN | 109212804 A | 1/2019 |
| CN | 105742312 B | 2/2019 |
| CN | 109377883 A | 2/2019 |
| CN | 109410764 A | 3/2019 |
| CN | 208636810 U | 3/2019 |
| CN | 109585500 A | 4/2019 |
| CN | 109686746 A | 4/2019 |
| CN | 109887987 A | 6/2019 |
| CN | 110034125 A | 7/2019 |
| CN | 209447443 U | 9/2019 |
| CN | 110534027 A | 12/2019 |
| CN | 111292626 A | 6/2020 |
| KR | 20120049696 A | 5/2012 |
| WO | 2019026285 A1 | 2/2019 |

OTHER PUBLICATIONS

Supplemental Search Report issued on Apr. 23, 2022, in connection with corresponding Chinese Application No. 201910955023.0 (5 pp., including machine-generated English translation).
International Search Report issued on Nov. 12, 2020 in corresponding International Application No. PCT/CN2020/105059; 5 pages.
First Office Action issued on Feb. 18, 2021 in corresponding Chinese Application No. 201910955023.0; 17 pages.
Second Office Action issued on Jul. 20, 2021 in corresponding Chinese Application No. 01910955023.0; 18 pages.

* cited by examiner

DISPLAY PANEL, DISPLAY DEVICE AND METHOD FOR MANUFACTURING DISPLAY PANEL

CROSS-REFERENCES TO RELATED APPLICATION

This is a continuation of International Patent Application No. PCT/CN2020/105059, filed Jul. 28, 2020, which claims priority to Chinese Patent Application No. 201910955023.0 filed with the CNIPA on Oct. 9, 2019, the disclosure of which is incorporated herein by reference in its entirety.

TECHNICAL FIELD

The present disclosure relates to the field of display techniques and, in particular, to a display panel, a display device and a method for manufacturing the display panel.

BACKGROUND

With the development of display technologies, people's requirements for display panels are getting higher and higher, and special-shaped display panels are more and more sought after. However, in the related art, the display panel cannot achieve multilateral bending, which limits the shape design of the display panel. Therefore, how to achieve the multilateral bending of the display panel has become an urgent problem to be solved in the display panel industry.

SUMMARY

The present disclosure provides a display panel, a display device and a method for manufacturing the display panel to achieve the multilateral bending of the display panel.

The present disclosure provides the following solutions.

A display panel includes a substrate and an edge trace. The substrate includes a first display region and at least two bending regions, and two adjacent ones of the at least two bending regions are bent to a same side or opposite side of the substrate.

The edge trace includes a first segment, a second segment and a third segment which are connected in sequence. The first segment of the edge trace and the third segment of the edge trace are respectively located in the two adjacent ones of the at least two bending regions, and the second segment of the edge trace is located in the first display region.

The present disclosure further provides a display device, including the display panel and the driver chip in any embodiments of the present disclosure.

The present disclosure further provides a method for manufacturing a display panel. The method includes the steps described below.

A substrate is provided. The substrate includes a first display region and at least two bending regions.

An edge trace is manufactured on the substrate. The edge trace includes a first segment, a second segment and a third segment which are connected in sequence, the first segment of the edge trace and the third segment of the edge trace are respectively located in two adjacent ones of the at least two bending regions, and the second segment of the edge trace is located in the first display region.

The at least two bending regions are bent toward a same side or opposite side of the substrate.

DETAILED DESCRIPTION

Figure 1:
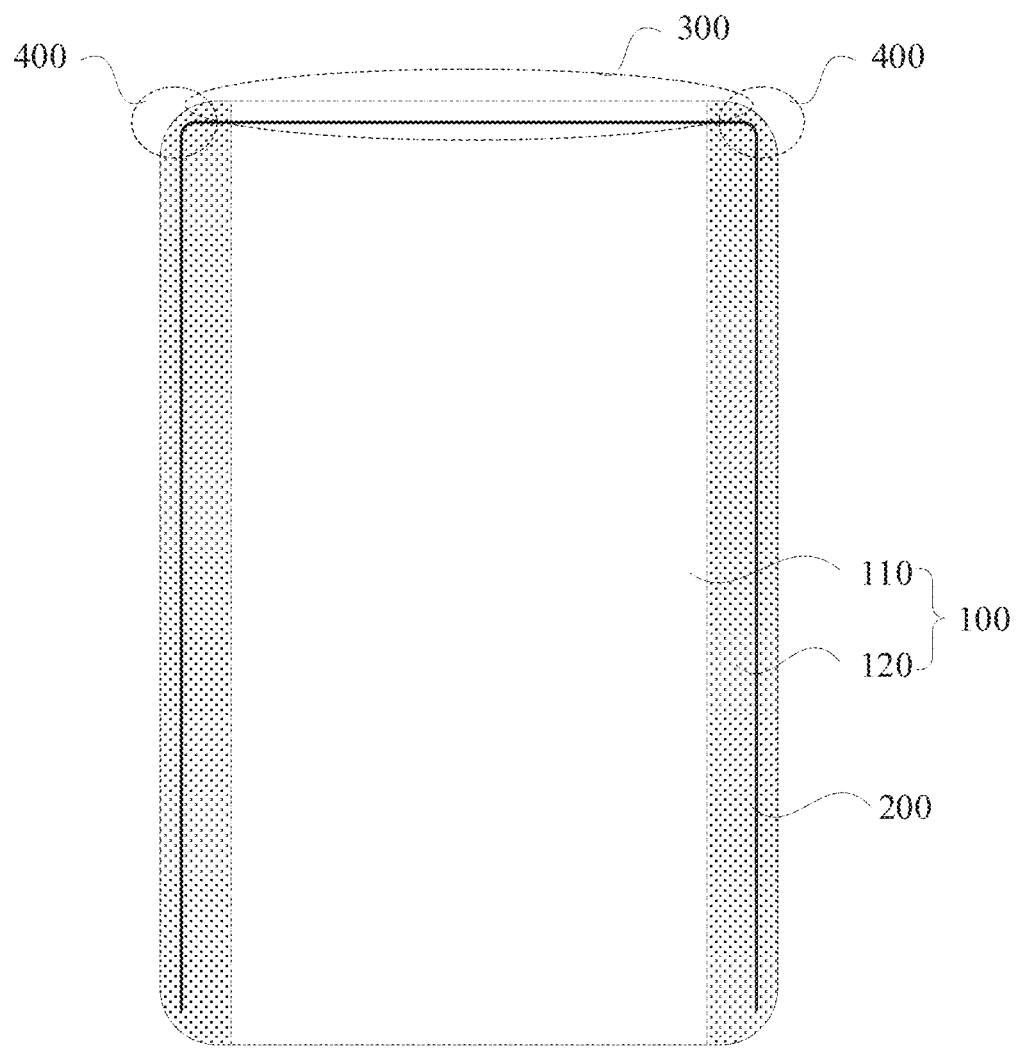
FIG. 1 is a structural diagram of a display panel.

The present disclosure is described hereinafter in conjunction with drawings and embodiments. The embodiments described herein are intended to explain and not to limit the present disclosure. For ease of description, only part, not all, of structures related to the present disclosure are illustrated in the drawings.

As described in the background art, the display panel has a phenomenon that it is impossible to achieve the multilateral bending. After research by the applicant, it is found that the reasons for this problem are as follows.

FIG. 1 is a structural diagram of a display panel. Referring to FIG. 1, the display panel includes a substrate 100, and the substrate 100 includes a main display region 110 and bending display regions 120 located on two sides of the main display region 110. The display panel further includes an edge trace 200 disposed on an edge of the substrate 100. The multilateral bending includes not only bending the bending display regions 120 on two sides of the display panel, but also bending a region 300 on the top of the display panel. However, when the region 300 on the top of the display panel is bent, portions of the edge trace 200 located in regions 400 between the bending display regions 120 located on two sides of the display panel and the region 300 located at the top of the display panel will be wrinkled, which will cause the edge trace 200 to break, thereby causing the display panel to fail to display normally. Based on this, the display panel cannot achieve the multilateral bending.

Figure 2:
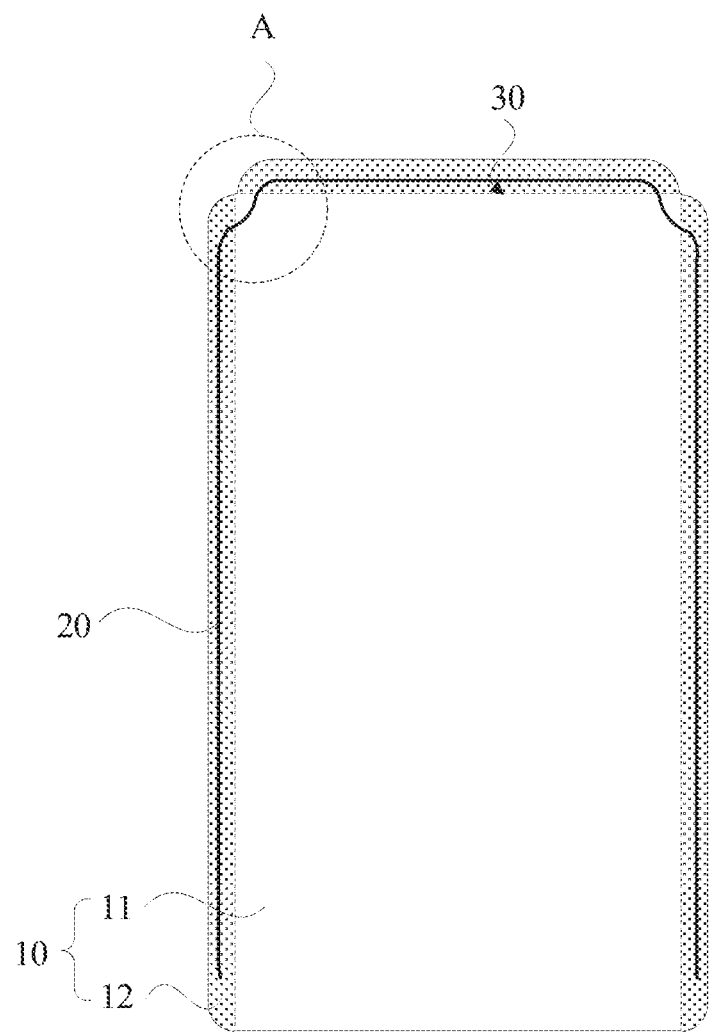
FIG. 2 is a structural diagram of a display panel according to an embodiment of the present disclosure.
Figure 3:
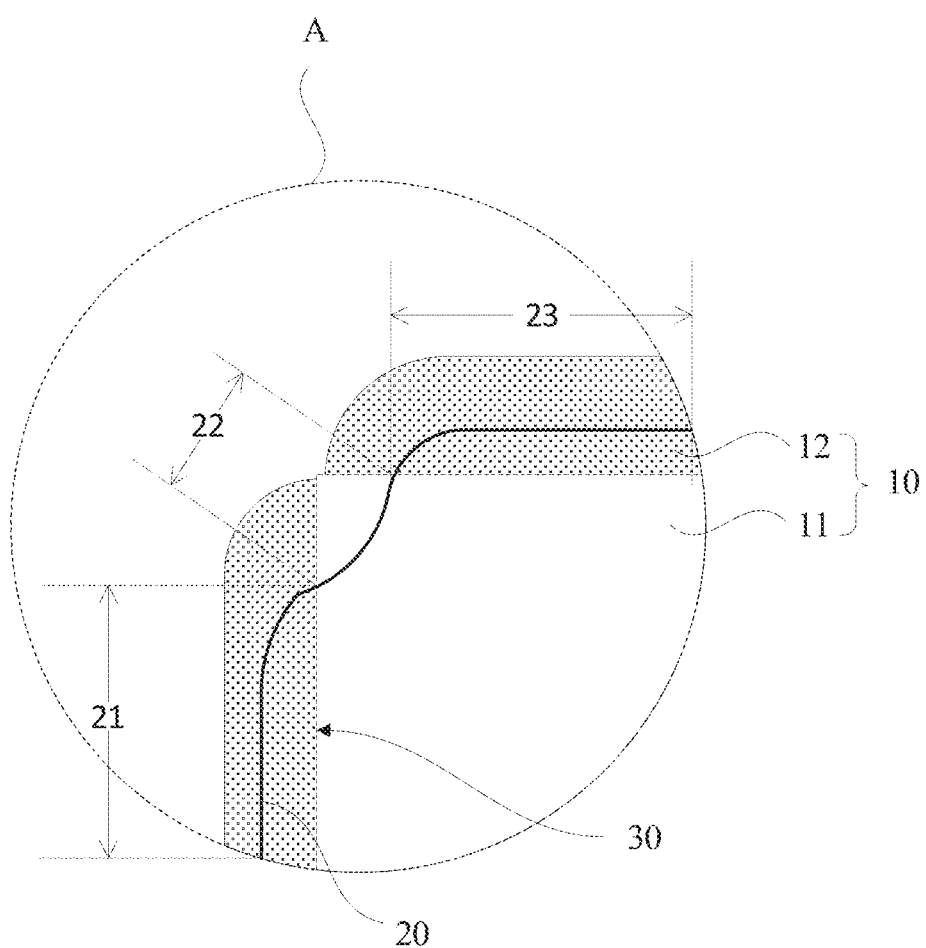
FIG. 3 is an enlarged view of a region A shown in FIG. 2.
Figure 4:
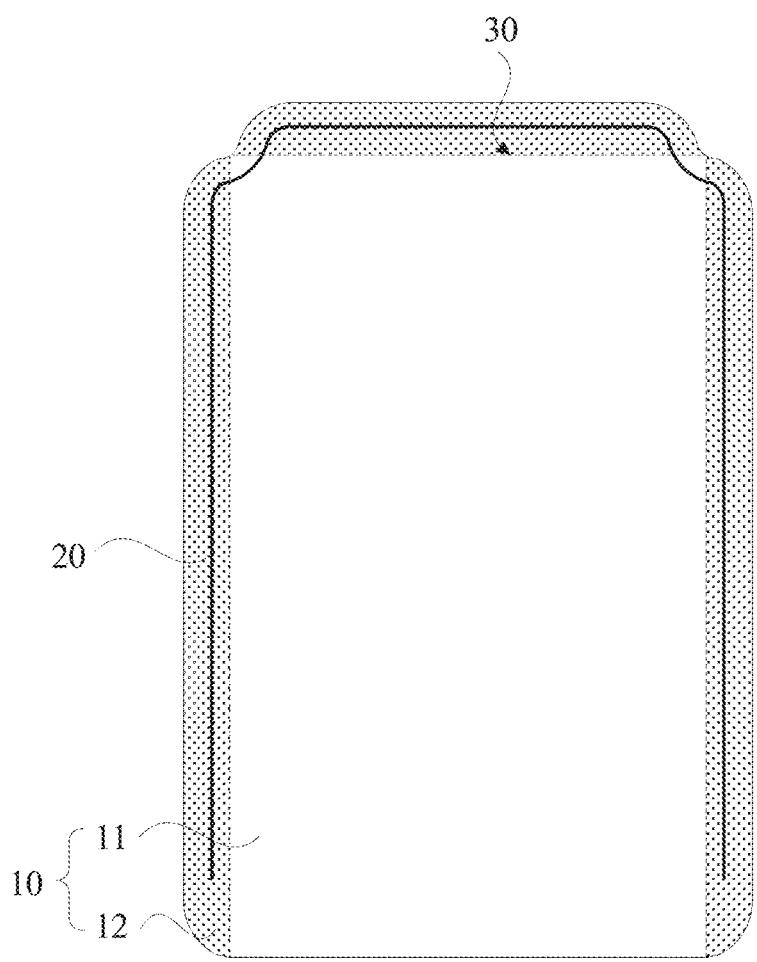
FIG. 4 is a structural diagram of FIG. 2 in a flattened state.

An embodiment of the present disclosure provides a display panel. FIG. 2 is a structural diagram of a display panel according to an embodiment of the present disclosure, FIG. 3 is an enlarged view of a region A shown in FIG. 2, and FIG. 4 is a structural diagram of FIG. 2 in a flattened state. Referring to FIGS. 2 to 4, the display panel includes a substrate 10 and an edge trace 20 disposed on the substrate 10. The substrate 10 includes a first display region 11 and at least two bending regions 12, and two adjacent bending regions 12 are bent to a same side or opposite side of the substrate 10.

The display panel includes three bending regions 12, and the three bending regions 12 are respectively located on a left side, an upper side and a right side of the first display region 11, which are exemplarily shown in FIGS. 2 and 4. In this embodiment, the three bending regions 12 are in sequence arranged along edges 30 of the first display region 11. The three bending regions 12 are all connected to the first display region 11. Boundary lines between the three bending regions 12 and the first display region 11 are in sequence arranged along the edges 30 of the first display region 11. The boundary lines are also bending start lines of the three bending regions 12. The bending regions 12 corresponding to the adjacent boundary lines are adjacent bending regions 12. Exemplarily, the bending region 12 located on the left side is adjacent to the bending region 12 located on the upper side, and the bending region 12 located on the upper side is adjacent to the bending region 12 located on the right side.

The edge trace 20 includes a first segment 21, a second segment 22 and a third segment 23 which are connected in sequence. The first segment 21 of the edge trace 20 and the third segment 23 of the edge trace 20 are respectively located in the adjacent bending regions 12, and the second segment 22 of the edge trace 20 is located in the first display region 11. In this embodiment, with such configuration, when the bending region 12 on the left side and the bending region 12 on the upper side are simultaneously bent from the flattened state, the first segment 21 of the edge trace 20 is bent along with the bending region 12 on the left side, the second segment 22 of the edge trace 20 is kept in an original state along with the first display region 11, and the third segment 23 of the edge trace 20 is bent along with the bending region 12 on the upper side. In this way, the first segment 21, the second segment 22 and the third segment 23 of the edge trace 20 are all not wrinkled, that is, the edge trace 20 will not be wrinkled, thus avoiding breaking of the edge trace 20. Similarly, when the bending region 12 on the upper side and the bending region 12 on the right side are simultaneously bent from the flattened state, the edge trace 20 will also not be wrinkled. Therefore, compared with the related art, this embodiment avoids the phenomenon that the edge trace 20 is broken due to wrinkles when the multilateral bending is performed on the display panel, thereby facilitating the implementation of the multilateral bending of the display panel.

In the above embodiment, it is exemplarily shown that two adjacent bending regions 12 are bent to the same side of the substrate 10, which does not limit the present disclosure. In other embodiments, two adjacent bending regions 12 may also be bent to the opposite side of the substrate 10, that is, one of the two adjacent bending regions 12 is bent to one side of the substrate 10 and the other of the two adjacent bending regions 12 is bent to the other side of the substrate 10.

On the basic of the above embodiment, in one embodiment, each of the bending regions 12 includes a second display region for displaying images, and the first display region 11 and the second display regions together constitute a display region of the display panel, so that the display images can be displayed not only in the first display region, but also in the bending regions 12, so as to achieve a richer display effect.

With continued reference to FIGS. 2 to 4, on the basic of the above embodiment, in one embodiment, the edge trace 20 is at least one of a power line, a clock signal line, a shift signal line, a potential signal line or a data line.

In this embodiment, the power line is disposed to provide energy for pixels on the display panel to emit light, the edge trace 20 provided in this embodiment includes the power line, and the power line may be disposed thicker and surrounds the display panel, which helps to avoid the difference in luminance brightness of pixels located at the top and bottom ends of the display panel caused by a voltage drop, and helps to improve the display uniformity of the display panel.

The clock signal line, the shaft signal line and the potential signal provide signals to scanning circuits. The scanning circuits, for example, may be gate driver IN panels (GIP), and provide scanning signals for the pixels to drive the pixels to be turned on line-by-line. Exemplarily, the GIPs are disposed on a non-display region of the display panel, each GIP and a pixel row corresponding to the each GIP are located on a same row. The edge trace 20 of this embodiment includes the clock signal line, the shaft signal line and/or the potential signal, that is, the clock signal line, the shaft signal line and/or the potential signal is disposed in the two adjacent bending regions 12, and the driving signals are transmitted in the adjacent bending regions 12. Exemplarily, the driving signals are provided to the GIPs corresponding to the bending region 12 on the upper side through the bending region 12 on the left side, thus driving the GIPs to provide the scanning signals for pixels in the second display regions, and ensuring the normal display of the bending region 12 on the upper side.

Exemplarily, a data driving circuit is disposed on an upper rear surface of the display panel, provides data signals to the first display region 11 and provides the data signals to the second regions in the bending region 12 on the upper side, the bending region 12 on the left side and the bending region 12 on the right side. The edge trace 20 in this embodiment includes the data line, which facilitates the data driving circuit to provide the data signals to the second display regions in the bending region 12 on the left side and the bending region 12 on the right side, so as to ensure the normal display of the bending region 12 on the left side and the bending region 12 in the right side.

With continued reference to FIGS. 2 to 4, on the basic of the above embodiment, in one embodiment, the first segment of the edge trace 20 and the second segment of the edge trace 20 are connected by a curve; and/or the second segment of the edge trace 20 and the third segment of the edge trace 20 are connected by a curve. In this embodiment, the edge trace 20 in the first display region 11 and the edge trace 20 in the bending regions 12 are transitioned by curves, therefore, the first segment 21 and the second segment 22 of the edge trace 20 and the second segment 22 and the third segment 23 of the edge trace 20 are smoothly transitioned, and a surface area of the edge trace 20 is simultaneously increased, so that when the bending regions 12 are bent, the force on the edge trace 20 is not easy to concentrate, thereby facilitating the improvement of the bending resistance of the edge trace 20.

With continued reference to FIGS. 2 to 4, on the basic of the above embodiment, in one embodiment, the second segment of the edge trace 20 is in an arcuate shape, which increases the surface area of the edge trace 20, so that when the bending regions 12 are bent, the force of the edge trace 20 is not easy to concentrate, thereby facilitating the improvement of the bending resistance of the edge trace 20.

With continued reference to FIGS. 2 to 4, exemplarily, the second segment 22 of the edge trace 20 is in an arcuate shape convex toward the center of the first display region 11, a connection region between the first segment 21 of the edge trace 20 and the second segment 22 of the edge trace 20 is in an arcuate shape convex toward a direction opposite to the convex direction of the second segment 22, and a connection region between the third segment 23 of the edge trace 20 and the second segment 22 of the edge trace 20 is in an arcuate shape convex toward a direction opposite to the convex direction of the second segment 22. In this embodiment, the edge trace 20 is twisted, so that the edge trace 20 is smoothly transitioned, and the surface area of the edge trace 20 is increased. In this manner, the force of the edge traces 20 is not easy to concentrate, thereby facilitating the improvement of the bending resistance of the edge trace 20.

Figure 5:
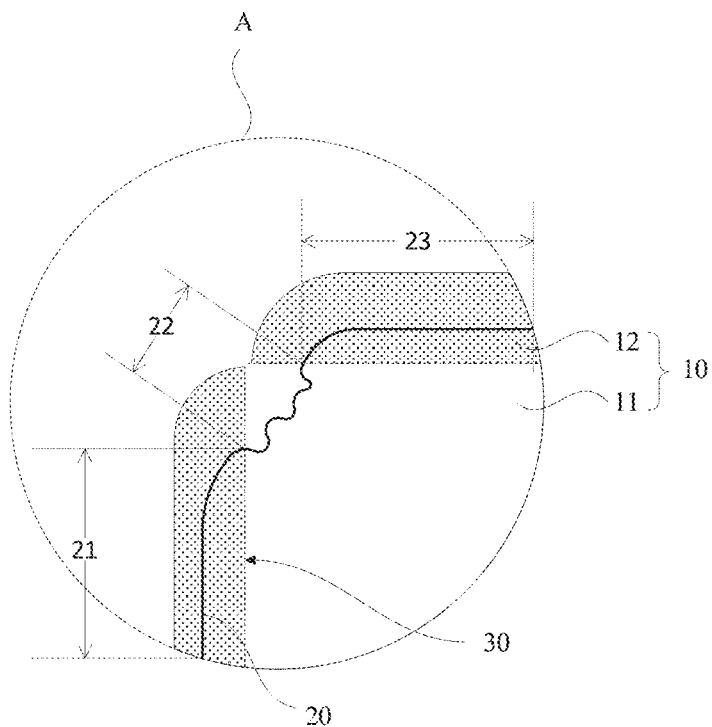
FIG. 5 is a structural diagram of anther display panel according to an embodiment of the present disclosure.
Figure 6:
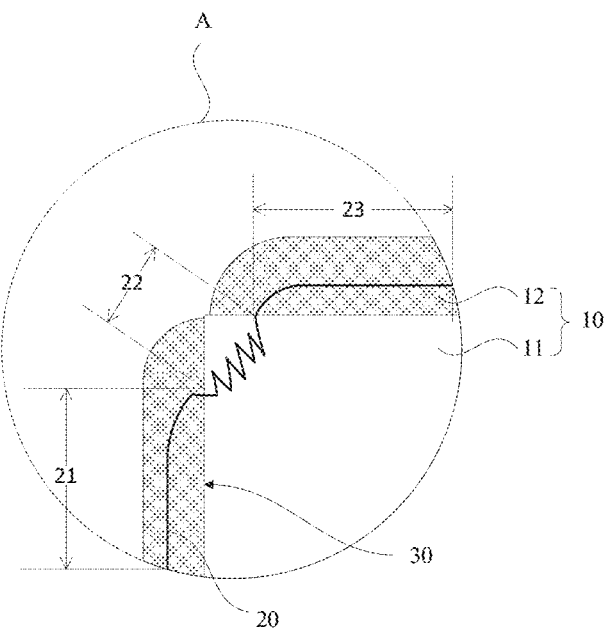
FIG. 6 is a structural diagram of anther display panel according to an embodiment of the present disclosure.

FIGS. 2 to 4 exemplarily show a setting manner of the edge trace 20, which does not limit the present disclosure. In other embodiments, the second segment 22 of the edge trace 20 may also be wavy (as shown in FIG. 5), saw tooth (as shown in FIG. 6) or a combination thereof, which may be set as desired in practical applications.

Figure 7:
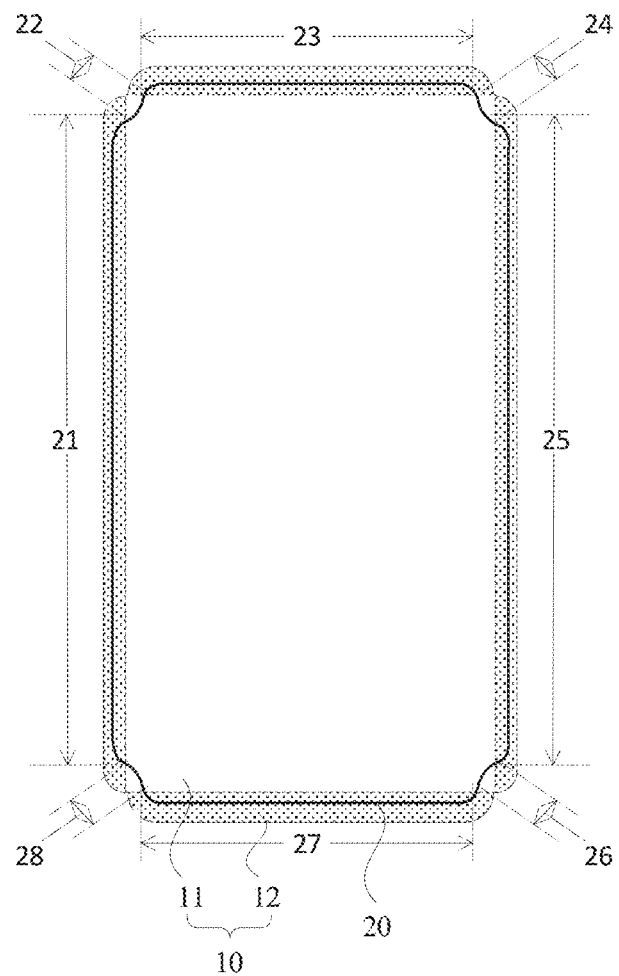
FIG. 7 is a structural diagram of anther display panel according to an embodiment of the present disclosure.
Figure 8:
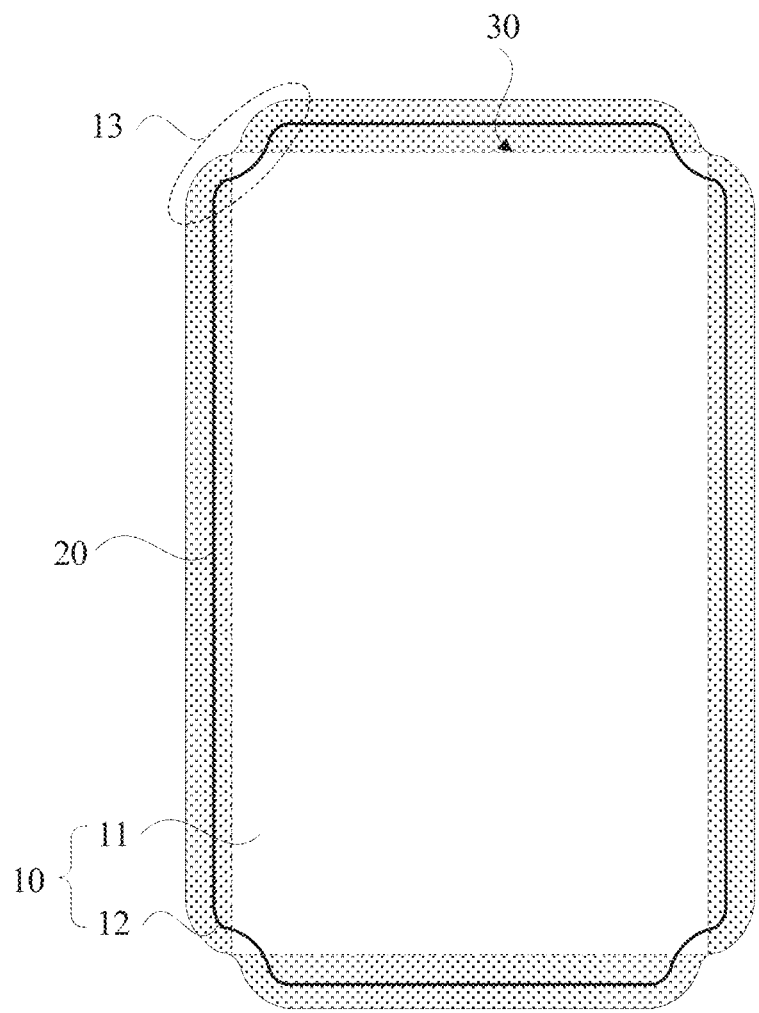
FIG. 8 is a structural diagram of FIG. 7 in a flattened state.

FIG. 7 is a structural diagram of anther display panel according to an embodiment of the present disclosure, and FIG. 8 is a structural diagram of FIG. 7 in a flattened state. Referring to FIGS. 7 and 8, on the basis of the above embodiment, in one embodiment, there are four bending regions 12, and the four bending regions 12 surround the first display region 11. In this embodiment, the four bending regions 12 are respectively located on the left side of the first display region, the upper side of the first display region, the right side of the first display region and the lower side of the first display region 11, so as to achieve the bending of the four sides of the display panel and enrich the display effect of the display panel.

With continued reference to FIGS. 7 and 8, on the basic of the above embodiments, in one embodiment, the edge trace 20 includes the first segment 21, the second segment 22, the third segment 23, a fourth segment 24, a fifth segment 25, a sixth segment 26, a seventh segment 27 and an eighth segment 28 which are in sequence connected end to end, the first segment 21 of the edge trace 20, the third segment 23 of the edge trace 20, the fifth segment 25 of the edge trace 20 and the seventh segment 27 of the edge trace 20 are located in the four bending regions 12, and the second segment 22 of the edge trace 20, the fourth segment 24 of the edge trace 20, the sixth segment 26 of the edge trace 20 and the eighth segment 28 of the edge trace 20 are located in the first display region 11. With such arrangement in this embodiment, the edge trace 20 is connected end to end on the basis that the four sides of the display panel are bent, so as to shield electromagnetic interference, thereby facilitating the improvement of the display stability of the display panel.

With continued reference to FIGS. 7 and 8, on the basic of the above embodiment, in one embodiment, there is no overlap between adjacent bending regions 12, that is, multiple bending regions 12 are not connected to each other. With such arrangement in the embodiment of the present disclosure can prevent the adjacent bending regions 12 from interfering with each other during the bending process of the bending regions 12, so that the adjacent bending regions 12 do not wrinkle at the corners 13 of the display panel, thereby facilitating the bending of the adjacent bending regions 12 and facilitating the bending of the four sides of the display panel.

The bending achieved by the bending regions in this embodiment may be a fixed curvature bending, or may also be a variable curvature bending, that is, the bending state of the bending regions can be bent at will according to the service condition. Bending types of the bending regions may also be configured as needed in application.

An embodiment of the present disclosure further provides a display device. The display device includes the display panel and the driver chip in any one of embodiments of the present disclosure, and the driver chip is disposed on one side of the substrate. In one embodiment, the driver chip may achieve, for example, a data driving function, a sequential logic function, a power conversion function, or an integration of multiple functions. The display device includes the display panel in any one of embodiments of the present disclosure, and its technical principles and technical effects are similar, and will not be described here.

Figure 9:
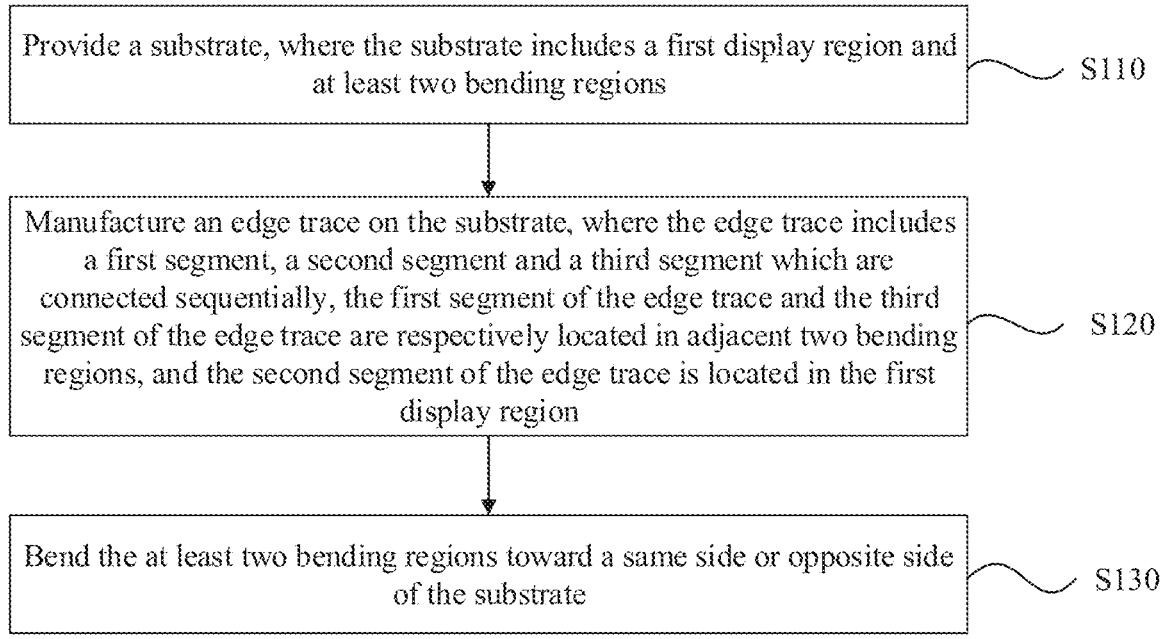
FIG. 9 is a flowchart of a method for manufacturing a display panel according to an embodiment of the present disclosure.

An embodiment of the present disclosure further provides a method for manufacturing a display panel. FIG. 9 is a flowchart of a method for manufacturing a display panel according to an embodiment of the present disclosure. Referring to FIG. 9, the method for manufacturing the display panel includes the steps described below.

In step S110, a substrate is provided. The substrate includes a first display region and at least two bending regions.

In step S120, an edge trace is manufactured on the substrate. The edge trace includes a first segment, a second segment and a third segment which are connected in sequence, the first segment of the edge trace and the third segment of the edge trace are respectively located in two adjacent bending regions, and the second segment of the edge trace is located in the first display region.

In step S130, the at least two bending regions are bent toward a same side or opposite side of the substrate.

In this embodiment, the edge trace includes the first segment, the second segment and the third segment which are connected in sequence, the first segment of the edge trace and the third segment of the edge trace are respectively located in adjacent bending regions, and the second segment of the edge trace is located in the first display region. When the bending region on the left side and the bending region on the upper side are simultaneously bent from a flattened state, the first segment of the edge trace is bent along with the bending region on the left side, the second segment of the edge trace is kept in an original state along with the first display region, and the third segment of the edge trace is bent along with the bending region on the upper side. In this way, the first segment, the second segment and the third segment of the edge trace are all not wrinkled, that is, the edge trace will not be wrinkled, thus avoiding breaking of the edge trace. Similarly, when the bending region on the upper side and the bending region on the right side are simultaneously bent from the flattened state, the edge trace will also not be wrinkled. Therefore, the embodiment of the present disclosure avoids the phenomenon that the edge trace is broken due to wrinkles when the multilateral bending is performed on the display panel, thereby facilitating the implementation of the multilateral bending of the display panel.

On the basic of the above embodiments, in one embodiment, before bending the bending regions toward the same side or opposite side of the substrate, the method further includes: patterning a substrate so that there is no overlap between adjacent bending regions. This arrangement in the embodiment can prevent the adjacent bending regions from interfering with each other during the bending process of the bending regions, so that the multiple bending regions do not wrinkle at the corners of the display panel, thereby facilitating the bending of the adjacent bending regions and facilitating the bending of the four sides of the display panel.

What is claimed is:
1. A display panel, comprising:
a substrate, wherein the substrate comprises a first display region and at least two bending regions, and two adjacent bending regions of the at least two bending regions are bent to a same side or opposite sides of the substrate; and an edge trace, wherein the edge trace comprises a first segment, a second segment, a third segment, a fourth segment, and a fifth segment which are connected in sequence, the first segment of the edge trace and the third segment of the edge trace are respectively located in the two adjacent bending regions of the at least two bending regions, the third segment of the edge trace and the fifth segment of the edge trace are respectively located in the two adjacent bending regions of the at least two bending regions, the second segment and the fourth segment of the edge trace are is located in the first display region, the second segment and the fourth segment are connected together through the third segment, a line where the first segment of the edge trace is located is parallel to a line where the fifth segment of the edge trace is located, and a line where the third segment of the edge trace is located and a line where the first segment of the edge trace is located intersect at a point.

2. The display panel of claim 1, wherein the first segment of the edge trace and the second segment of the edge trace are connected by a curve and/or the second segment of the edge trace and the third segment of the edge trace are connected by a curve and/or the third segment of the edge trace and the fourth segment of the edge trace are connected by a curve.

3. The display panel of claim 1, wherein a shape of the second segment and the fourth segment of the edge trace comprises at least one of an arcuate shape, a wave or a saw tooth.

4. The display panel of claim 1, wherein there is no overlap between the two adjacent ones of the at least two bending regions.

5. The display panel of claim 1, wherein the at least two bending regions comprise four bending regions surrounding the first display region, the edge trace comprises the first segment, the second segment, the third segment, a fourth segment, the fifth segment, a sixth segment, a seventh segment and an eighth segment which are connected end to end in sequence, the first segment of the edge trace, the third segment of the edge trace, the fifth segment of the edge trace and the seventh segment of the edge trace are respectively located in the four bending regions, and the second segment of the edge trace, the fourth segment of the edge trace, the sixth segment of the edge trace and the eighth segment of the edge trace are located in the first display region.

6. The display panel of claim 5, wherein the four bending regions are located on a left side, an upper side, a right side and a lower side of the first display region, respectively.

7. The display panel of claim 1, wherein the at least two bending regions comprise a second display region for displaying images and the first display region and the second display region form a whole display region.

8. The display panel of claim 7, wherein the edge trace comprises at least one of a power line, a clock signal line, a shift signal line, a potential signal line or a data line.

9. The display panel of claim 8, wherein the edge trace comprises a clock signal line, a shift signal line, a potential signal line and a data line disposed in the at least two bending regions to transport signals for display of the second display region.

10. The display panel of claim 1, wherein the first segment of the edge trace comprises a first connection region connected with the second segment of the edge trace, the third segment of the edge trace comprises a second connection region connected with the second segment of the edge trace, and the first connection region and the second connection region are both in arcuate shape convex toward a direction opposite to a convex direction of the second segment of the edge trace.

11. A display panel, comprising:
a substrate, wherein the substrate comprises a first display region and at least two bending regions, and two adjacent bending regions of the at least two bending regions are bent to a same side or opposite sides of the substrate; and
an edge trace, wherein the edge trace comprises a first segment, a second segment, a third segment, a fourth segment, and a fifth segment which are connected in sequence, the first segment of the edge trace and the third segment of the edge trace are respectively located in the two adjacent bending regions of the at least two bending regions, the third segment of the edge trace and the fifth segment of the edge trace are respectively located in the two adjacent bending regions of the at least two bending regions, the second segment and the fourth segment are connected together through the third segment, a line where the first segment of the edge trace is located is parallel to a line where the fifth segment of the edge trace is located, and a line where the third segment of the edge trace is located and a line where the first segment of the edge trace is located intersect at a point.

12. The display panel of claim 11, wherein the first segment of the edge trace and the second segment of the edge trace are connected by a curve and/or the second segment of the edge trace and the third segment of the edge trace are connected by a curve and/or the third segment of the edge trace and the fourth segment of the edge trace are connected by a curve.

13. The display panel of claim 11, wherein the at least two bending regions comprise four bending regions surrounding the first display region, wherein the edge trace comprises the first segment, the second segment, the third segment, a fourth segment, the fifth segment, a sixth segment, a seventh segment and an eighth segment which are connected end to end in sequence, the first segment of the edge trace, the third segment of the edge trace, the fifth segment of the edge trace and the seventh segment of the edge trace are respectively located in the four bending regions.

14. The display panel of claim 13, wherein the four bending regions are located on a left side, an upper side, a right side and a lower side of the first display region, respectively.

15. The display panel of claim 14, wherein the edge trace comprises at least one of a power line, a clock signal line, a shift signal line, a potential signal line or a data line.

16. The display panel of claim 14, wherein the edge trace comprises a potential signal line disposed in the left side and the upper side and the right side, and the potential signal line is connected together on the upper side.

17. The display panel of claim 11, wherein the at least two bending regions comprise a second display region for displaying images and the first display region and the second display region form a whole display region.

18. A display device, comprising:
the display panel of claim 11; and
a driver chip, wherein the driver chip is disposed on one side of a substrate of the display panel.

19. The display panel of claim 11, wherein the line where the third segment of the edge trace is located and the line where the first segment of the edge trace is located are perpendicular to each other.

20. The display panel of claim 11, wherein the first segment, the third segment and the fifth segment of the edge trace are located on a left side, an upper side, and a right side of the first display region, respectively.

* * * * *